H. L. G. MOORE.
EGG HOLDER AND CARRIER.
APPLICATION FILED MAR. 29, 1916.
1,329,674.
Patented Feb. 3, 1920.
2 SHEETS—SHEET 1.
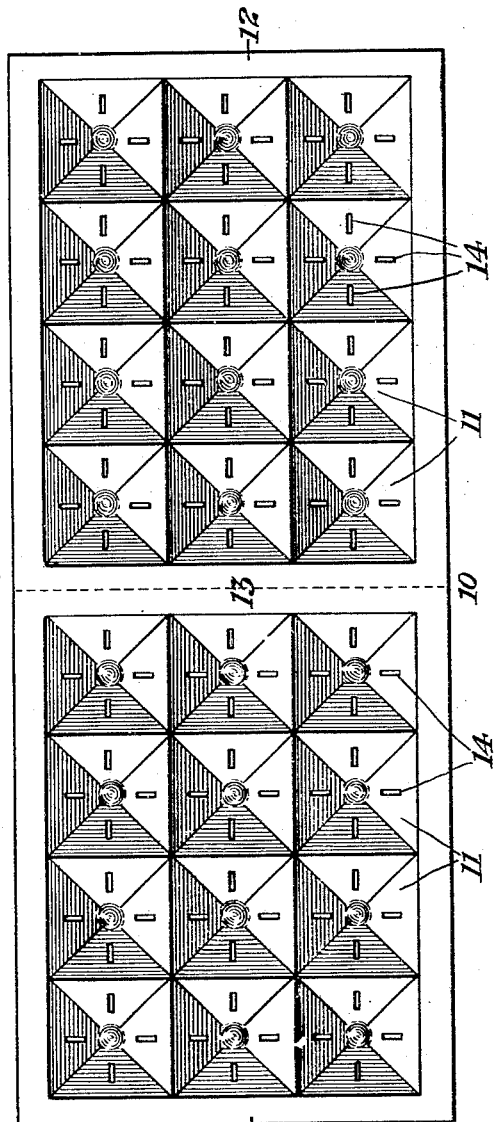
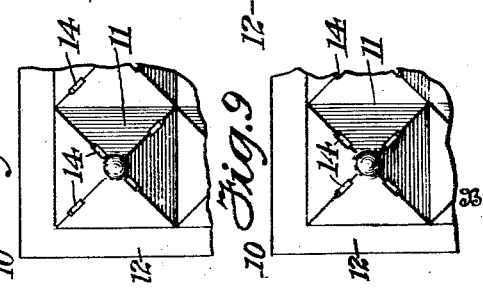
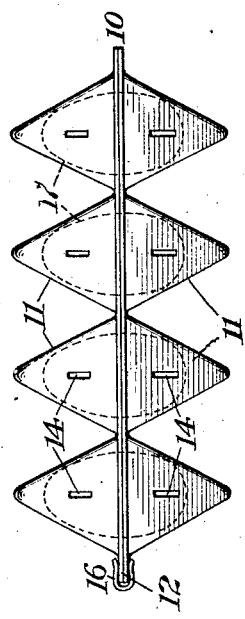
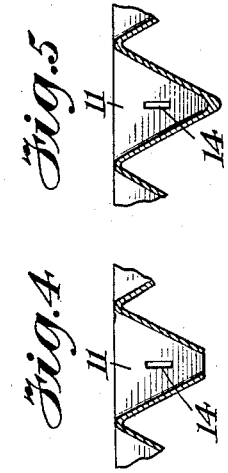
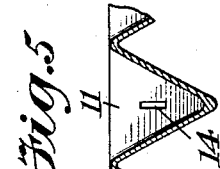

H. L. G. MOORE.
EGG HOLDER AND CARRIER.
APPLICATION FILED MAR. 29, 1916.
1,329,674.
Patented Feb. 3, 1920.
2 SHEETS—SHEET 2.
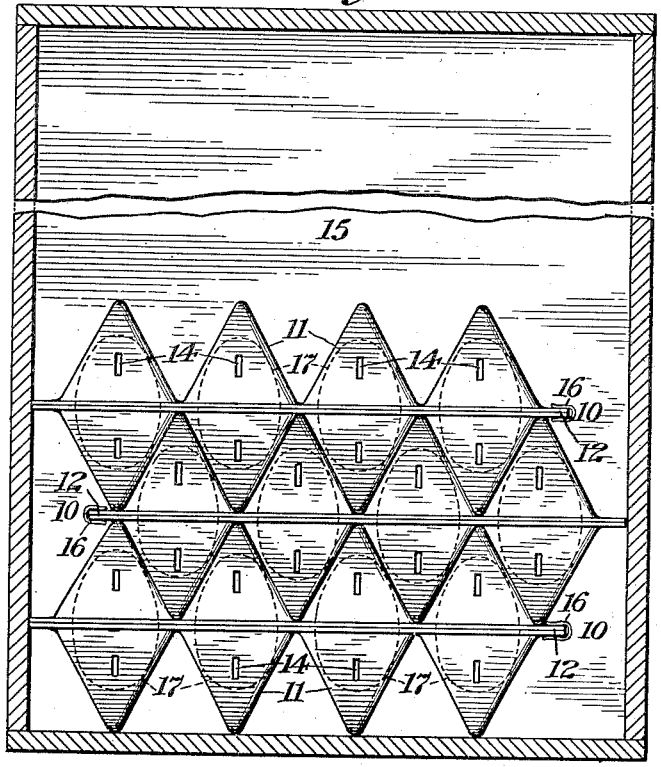
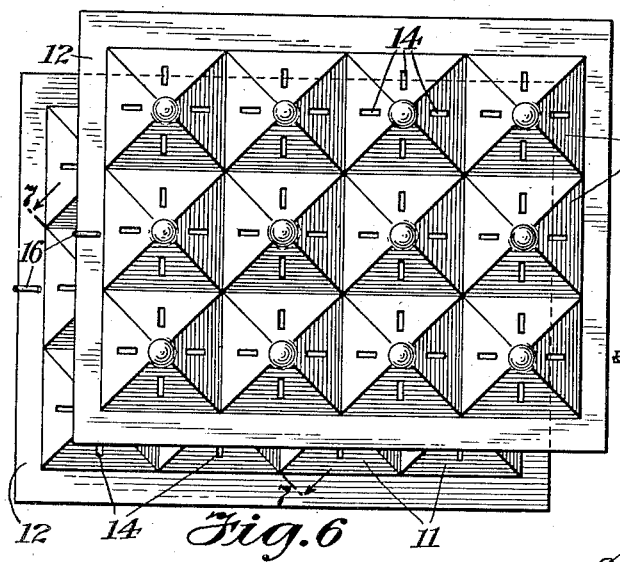
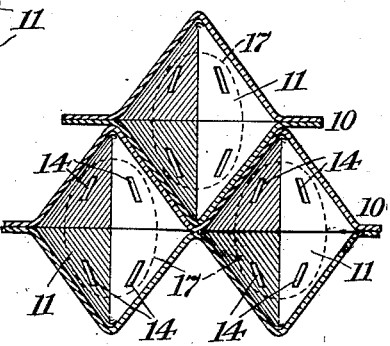
Inventor
Herbert L. G. Moore
By his Attorneys
Serrell & Son

UNITED STATES PATENT OFFICE.

HERBERT L. G. MOORE, OF HOHOKUS, NEW JERSEY.

EGG HOLDER AND CARRIER.

1,329,674.  Specification of Letters Patent.  Patented Feb. 3, 1920.

Application filed March 29, 1916. Serial No. 87,417.

*To all whom it may concern:*

Be it known that I, HERBERT L. G. MOORE, a citizen of the United States, residing at Hohokus, in the county of Bergen and State of New Jersey, have invented an Improvement in Egg Holders and Carriers, of which the following is a specification.

My invention relates to holders and carriers for the retail delivery or shipment of eggs in quantities either by express, parcel post, or as freight, in such manner as to withstand rough usage without danger of breakage, the eggs being protected from contact with one another and from injury should the holder receive a blow or severe jar from contact with another object.

In Letters Patent No. 1,108,606, granted to me August 25, 1914, I have shown an egg holder and carrier composed of two members interlocked to form a plurality of adjoining pockets with inclined walls. These members are two separate strips of cardboard each cut, scored, and folded to adapt them to be interlocked in such manner that one member forms the bottom of the tray and two of the inclined walls in each egg receptacle, while the other member forms the top of the tray and completes the four inclined walls of each egg receptacle. The object of my present invention is to form a somewhat similar tray or holder out of a single piece of material, thereby greatly economizing in labor and cost of production and avoiding the necessity of cutting, scoring, folding, or assembling any sections, at the same time providing for giving the desired degree of resiliency to the side walls of each egg receptacle.

The details of my invention are hereinafter more particularly described.

In the accompanying drawings:

Figure 1, is a plan view of a tray made accordingly to my invention, and in the position ready to receive the eggs.

Fig. 2, is an elevation of the same after being filled with eggs.

Fig. 3, is an elevation, showing the manner of packing the filled trays for shipment by post or express, the container or box holding the trays being in section.

Figs. 4 and 5, are sectional views illustrating different modifications in the formation of the pockets at the bottom part.

Fig. 6, is a plan view of two double trays nested for shipment,

Fig. 7, is a sectional view taken on the broken line 7, 7, of Fig. 6, and

Figs. 8 and 9, are inverted plan views of a single pocket showing modifications in the location of the slots.

The respective figures illustrate the invention in half size.

Similar reference characters indicate the same parts throughout the several views.

10, indicates a double tray formed from one piece of material, each tray being provided with a plurality of adjoining pockets 11 open at the top, each pocket having walls inclined toward one point.

A flange or rim 12, extends at right angles all around the top of the tray. The strip 13, spacing the two trays is of such width that when bent on its longitudinal center one tray may be folded over upon the top of the other tray so that the pockets in the respective trays will register as will the edges of the flange or rim 12.

The trays may be made of any suitable material pressed or molded to shape, but I prefer to form them from paper pulp in suitable molds. This material when thoroughly dried provides a tray of sufficient strength to effectively answer the purpose particularly in view of the shape of the pockets, and in order to give the egg pockets a certain degree of resiliency, I provide therein slots 14, which may be formed in the inclined side walls of the pockets, or in the corners of the pockets as desired.

These slots are preferably narrow and somewhat elongated, but not of such size as to weaken the strength of the pockets to any appreciable extent.

The side walls of the pockets 11, may converge to a point, or the bottom of the pockets may be open as shown in Fig. 4; or the bottom may be closed and of thicker material at such point as shown in Fig. 5, but I prefer that the bottom be of the same thickness as the side walls and blunt or slightly rounded as shown in the other figures.

It will be understood that, if desired, the trays may be made separate; but I prefer to make two joined trays out of one piece of material as shown. The eggs 17, (shown in broken lines) are placed in one tray and the other tray is then folded over upon the filled tray, the pockets in the inverted tray coming directly over and in alinement with the pockets in the filled tray whereby the two trays will each cover one half of the eggs in such manner that the top, bottom and middle portions of each egg will be out of contact with the walls of the pockets, and each pocket has a springing or yielding function in consequence of the slots 14, which provides against danger of breaking the eggs in transportation.

The trays may be made of a size to contain any desired number of eggs, but it is customary to make each double tray of a size to hold and cover one dozen eggs, and to ship from six to fifteen of such double trays in one box or outer casing.

In packing the filled double trays in a box or case, they are placed one above the other mismatched and nested as shown in Figs. 3, 6 and 7, where it will be seen that the side walls of the respective trays do not contact, the V-shaped edges only touching each other, thereby giving added strength to the package and additional protection to the eggs. 15, indicates the box or case in which the trays are packed in this manner. This box may be of wood or any other suitable material.

If desired one or more clips 16, may be placed over the double thickness of the flange 12, after the tray has been folded, as shown in Fig. 2.

It is obvious that empty trays unfolded as shown in Fig. 1, may be nested in large quantities with great economy in space for transportation.

I claim as my invention:

1. An egg holder and carrier comprising two connected trays formed from one piece of material, each tray having a plurality of adjoining pockets open at the top and having walls inclined toward one point, and provided with slots, said holder being foldable on the connection between the trays so that one tray may be inverted over the other with the pockets in the respective trays in register.

2. An egg tray formed of one piece of material and having a plurality of adjoining pockets open at the top, each pocket having a plurality of converging walls terminating in a closed bottom of increased thickness.

3. An egg tray formed of one piece of material and having a plurality of adjoining pockets open at the top, each pocket having a plurality of converging walls provided with slots in their inclined corners.

4. An egg tray formed of one piece of material having a series of egg receptacles each provided with a plurality of flat converging walls increased in thickness at their lower ends.

5. An egg holder and carrier comprising two connected trays formed from one piece of material, each tray having a plurality of adjoining pockets open at the top and having a plurality of flat converging walls slotted in their inclined edges, said holder being foldable on the connection between the trays so that one tray may be inverted over the other with the pockets in the respective trays in register, and means for holding them in such position.

Signed by me this 17th day of March, 1916.

HERBERT L. G. MOORE.